United States Patent [19]

Conley

[11] Patent Number: 4,847,958
[45] Date of Patent: Jul. 18, 1989

[54] INNERLOCK MEMBER FOR SHEET GRIPPING ASSEMBLY

[76] Inventor: John L. Conley, 3870 Chino Ave., Chino, Calif. 91710

[21] Appl. No.: 97,499

[22] Filed: Sep. 16, 1987

Related U.S. Application Data

[62] Division of Ser. No. 738,276, May 28, 1985, Pat. No. 4,694,543.

[51] Int. Cl.$^4$ .............................................. A44B 21/00
[52] U.S. Cl. ........................................ 24/461; 24/462
[58] Field of Search .................... 24/460–462, 24/545, 289; 160/391–393, 395; 52/63, 127.5, 222

[56] References Cited

U.S. PATENT DOCUMENTS

| | | | |
|---|---|---|---|
| 3,965,546 | 6/1976 | Hickle | 24/461 |
| 3,987,835 | 10/1976 | Bloomfield | 160/395 X |
| 4,103,401 | 8/1978 | Conley | 24/462 |
| 4,107,826 | 8/1978 | Tysdal | 24/460 |
| 4,153,981 | 5/1979 | Stuppy | 24/462 X |
| 4,267,876 | 5/1981 | Bloomfield | 160/395 X |
| 4,341,255 | 7/1982 | Mock | 160/392 X |
| 4,472,862 | 9/1984 | Bloomfield et al. | 24/462 X |
| 4,694,543 | 9/1987 | Conley | 24/462 X |

Primary Examiner—James R. Brittain
Attorney, Agent, or Firm—Boniard I. Brown

[57] ABSTRACT

A sheet gripping assembly for thin pliable sheet material, such as plastic film, having a channel shaped base member with a side opening through which may be inserted a fold of the sheet material to be secured, and innerlock and gripping bar members insertable into the base member through its side opening to assembled positions within the fold of sheet material within the base member wherein the sheet material is gripped between the base member and the innerlock and gripping bar members and the innerlock member resists expulsion of the gripping bar member from the base member by tension in the sheet material being gripped. According to an important feature of the invention, the innerlock member has a lip which projects externally of the base member through its side opening and the innerlock member is laterally flexible by finger pressure on the lip to facilitate insertion of the innerlock member into and removal of the innerlock member from the base member. The lip also shields the sheet material against being ruptured by the gripping bar member during its insertion into and removal from the base member.

1 Claim, 1 Drawing Sheet

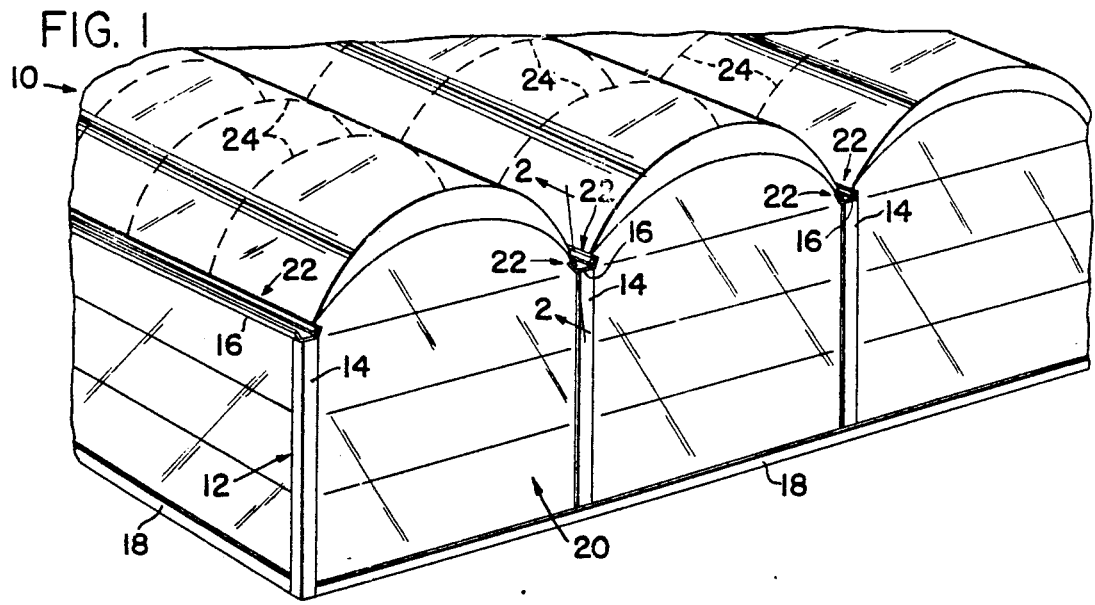
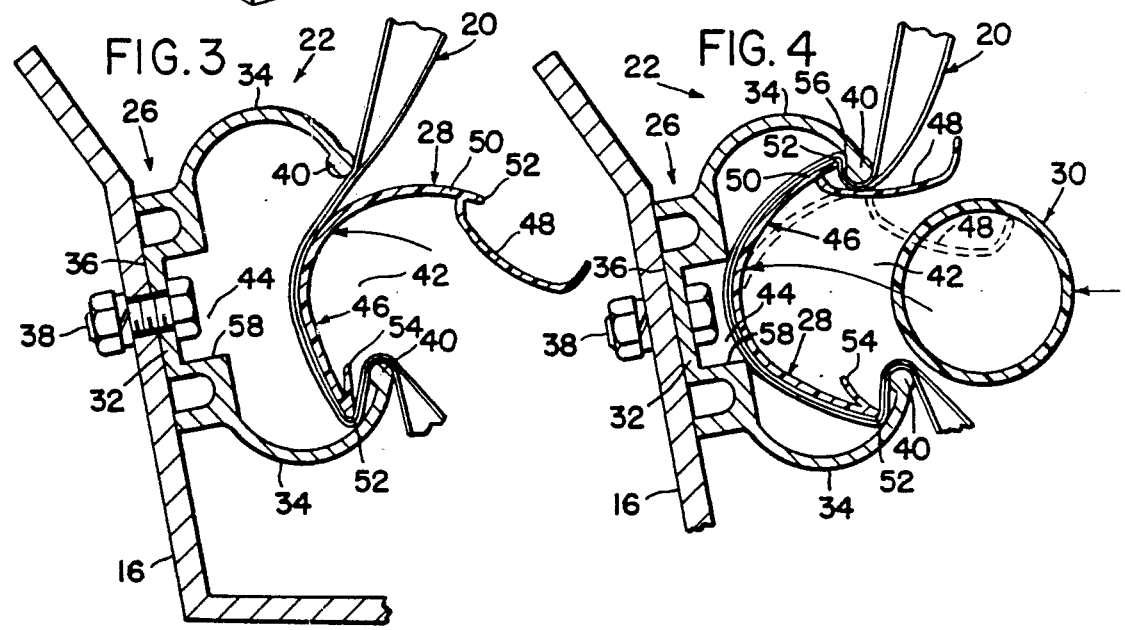
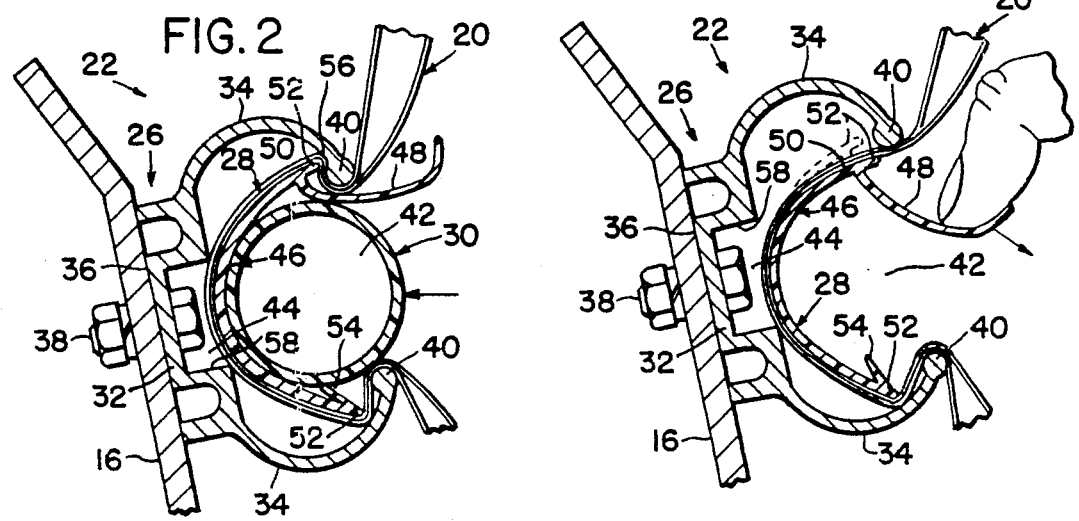

INNERLOCK MEMBER FOR SHEET GRIPPING ASSEMBLY

This is a divisional of co-pending application Ser. No. 06/738,276, filed on May 28, 1985, which matured into U.S. Pat. No. 4,694,543.

RELATED APPLICATIONS

Reference is made to my co-pending application Ser. No. 462,468 filed Jan. 31, 1983, abandoned, entitled Sheet Gripping Assembly For Single and Dual Sheet Material.

BACKGROUND OF THE INVENTION

1. Field of the Invention

This invention relates generally to gripping devices for sheet material, such as plastic film, and more particularly to an improved sheet gripping assembly of the general type disclosed in my prior Pat. No. 4,103,401.

2. Prior Art

Sheet gripping devices of the type to which this invention pertains are useful for a variety of sheet gripping applications. This invention, however, like that described in my above-mentioned patent, is intended primarily for use in constructing greenhouses of the class having a frame structure covered by thin plastic film or sheet material. For this reason, the invention will be described in this particular context.

The type of greenhouse construction referred to involves the assembly of pipes, tubes, wooden struts, or the like, into an open frame structure which is then covered with plastic film or sheet material which forms a weather and wind resistant covering or skin that is transparent to the sun's ultraviolet radiation. The plastic sheet material is attached to the frame structure by sheet gripping devices which are secured to the frame member and firmly grip the sheet material.

A variety of sheet gripping devices for this purpose have been devised. U.S. Pat. No. 3,803,671 discloses a sheet gripping device for this purpose. Simply stated, this patented sheet gripping device comprises an elongate channel shaped base having a longitudinal side opening bounded by longitudinal sheet gripping edges and a sheet gripping bar insertable laterally into the base through its open side. The major width of this gripping bar is greater than the width of the base side opening and either or both the base and the bar are sufficiently resilient to permit the bar to be forced laterally between the sheet gripping edges of the base into the interior channel or cavity within the base.

In use, the base of the sheet gripping device is firmly attached to the frame structure of the greenhouse. A plastic sheet is then placed across the base and tucked into its open side to form a fold within the base. Thereafter, the sheet gripping bar is inserted laterally through the open side of the base to a position within this fold. When the sheet gripping device and plastic sheet are thus assembled, the sheet extends into the interior of the base through its open side, between the gripping bar and one gripping edge of the base, then around the bar, and finally back through the open side of the base, between the gripping bar and the other gripping edge of the base. Accordingly, edgewise tension in the plastic sheet tends to force the sheet gripping bar laterally against the sheet gripping edges on the base, whereby the plastic sheet is firmly gripped between these gripping edges and the gripping bar.

Sheet gripping devices of this general type have one inherent defect which this invention seeks to overcome. This defect resides in the fact that tension in the sheet material not only urges the gripping bar laterally outward against the base gripping edges to grip the sheet material between the bar and gripping edges but also tends to force the bar outwardly between these gripping edges and thereby totally dislodge the bar from the base. If this occurs, of course, the plastic sheet is no longer gripped and is thus free to pull from the base. Tension force in the plastic sheet capable of dislodging the gripping bar from the base may result from wind loads on the sheet or shrinking of the sheet in cold weather. Moreover, in some cases, the plastic sheet material has a double wall thickness with entrapped air between the two walls. Thermal expansion of this air in hot weather creates tension forces in the sheet material which tend to dislodge the gripping bar from the base.

Various procedures have been devised in an attempt to solve this particular problem. My earlier mentioned prior Pat. No. 4,103,401, for example, discloses one solution to the problem. This latter sheet gripping device or assembly has an elongate channel shaped base with a longitudinal side opening bounded by longitudinal gripping edges, an elongate gripping bar insertable laterally through the side opening into the base, and an additional gripping channel which is also insertable into the base through its open side and itself has an open side bounded by longitudinal gripping edges. When assembled on a greenhouse frame structure to secure a plastic sheet to the structure, the gripping bar and channel are positioned within the base which is attached to the frame structure, and the gripping channel fits about the innermost side of the bar which projects into the channel through its open side. The plastic sheet extends into the base through its open side, between one base gripping edge, on the one hand, and the gripping bar and one gripping edge of the inner gripping channel, on the other hand, then about the innermost side of the gripping bar and channel, and finally back through the side opening of the base between the other base gripping edge, on the one hand, and the gripping bar and the other channel gripping edge, on the other hand.

In this latter sheet gripping device, tension in the plastic sheet urges both the inner gripping bar and inner gripping channel outwardly toward the side opening of the base to grip the sheet material between the gripping bar and the base gripping edges, as in the sheet gripping device of the above mentioned U.S. Pat. No. 3,803,671. In the improved gripping device of U.S. Pat. No. 4,103,401, however, increasing tension in the plastic sheet eventually urges the gripping bar and channel outwardly sufficiently to abut the channel gripping edges against the base gripping edges. The gripping bar, which projects into the open side of the gripping channel, resists lateral deflection of the channel gripping edges toward one another, whereby abutment of the latter edges with the base gripping edges affects gripping of the plastic sheet between these abutting edges and prevents complete dislodgement of the gripping bar from the base.

SUMMARY OF THE INVENTION

This invention provides an improved sheet gripping device or assembly of the kind disclosed in U.S. Pat. No. 4,103,401. This improved sheet gripping assembly has a channel shaped base member with an open longitudinal side bounded by longitudinal sheet gripping edges. Laterally insertable into the base member through this open side are an elongate gripping bar member and an elongate innerlock member. The innerlock member has a laterally resilient channel portion with an open side bounded by longitudinal sheet gripping edges and a lip joined to the channel portion adjacent one channel edge. This lip projects through and beyond the open side of the channel portion.

When assembled to grip sheet material, a fold of sheet material protrudes into the base member through its side opening. The gripping bar and innerlock members are positioned in the base member within this fold of sheet material with the gripping bar member adjacent the side opening in the base member and with the channel portion of the innerlock member receiving and encompassing the innermost side of the bar member. Accordingly, the sheet material enters the base member through its open side between one base gripping edge, on the one hand, and the gripping bar and one gripping edge of the innerlock member, on the other hand, then extends about the innermost sides of the innerlock member between the latter and the base member, and finally emerges from the base member between the other base gripping edge, on the one hand, and the gripping bar member and other gripping edge of the innerlock member, on the other hand.

Edgewise tension in the sheet material urges the innerlock and gripping bar members outwardly toward the side opening of the base member to grip the sheet material, initially, between the gripping bar member and the base gripping edges. Increasing sheet tension results in abutment of the gripping edges of the innerlock member with the gripping edges of the base member to grip the sheet material between the abutting edges and prevent total dislodging of the gripping bar member from the base member.

One unique feature of the improved sheet gripping assembly resides in the fact that the lip of the innerlock member is accessible for lateral deformation of the innerlock channel portion to facilitate insertion and removal of the innerlock member into and from the base member by finger pressure on the lip. According to another feature of the invention, when the base and innerlock members are assembled, the innerlock lip shields the sheet material against direct contact with, and thereby prevents ripping or tearing of the sheet material by, the gripping bar member when the latter is pressed laterally into the base member through its open side.

As noted earlier, the sheet gripping assembly of the invention is capable of a variety of sheet gripping applications. The primary application of the invention, however, is anchoring plastic film to a framework to form a greenhouse structure of the kind described earlier. Accordingly, the invention will be disclosed in connection with this particular application.

BRIEF DESCRIPTION OF THE DRAWINGS

FIG. 1 is a fragmentary perspective view of a greenhouse structure embodying sheet gripping assemblies according to the invention for attaching plastic film to the greenhouse frame structure;

FIG. 2 is an enlarged section taken on line 2—2 in FIG. 1 and illustrating, in transverse cross-section, one of the sheet gripping assemblies of the invention;

FIG. 3 is a section similar to FIG. 2 illustrating an initial step in securing the plastic film to the sheet gripping assembly;

FIG. 4 illustrates a subsequent step in securing the plastic film to the sheet gripping assembly; and FIG. 5 illustrates one step in releasing the plastic film from the sheet gripping assembly.

DESCRIPTION OF THE PREFERRED EMBODIMENT

Referring first to FIG. 1 of the drawings, the illustrated greenhouse 10 comprises an open frame structure 12 including uprights 14 joined and bridged at their upper ends by overhead beams 16. The lower ends of the uprights 14 are joined by base or sill members 18. Covering the frame structure 12 is sheet material 20, typically plastic film, which is transparent to the sun's ultraviolet radiation. This sheet material or plastic film is secured to the frame structure 12 by sheet gripping assemblies 22 according to the invention. The sheet gripping assemblies are attached to and extend along the uprights 14, overhead beams 16, and sill members 18. Extending between and secured to the overhead beams 16 are supporting arches 24 which support the overhead portions of the plastic film 20 between the beams, as shown. Except for the sheet gripping assemblies 22, the greenhouse structure 10 is conventional. Accordingly, no further description of this structure is considered necessary.

The sheet gripping assemblies 22 of the invention will now be described in detail by reference to FIGS. 2 through 5. Simply stated, the sheet gripping assembly 22 comprises a channel shaped base member 26, an innerlock member 28, and a sheet gripping member 30. The base member 26 has a channel shaped cross-section and includes a base wall 32 and edge walls 34 joined to the base wall. The base wall 32 has a flat base surface 36 and is apertured along its longitudinal centerline to receive mounting bolts 38. The edge walls 34 are arcuate in transverse cross-section and bow outwardly away from one another. The outer longitudinal edge portions of these edge walls curve inwardly over the base wall 32 and terminate in slightly enlarged and rounded sheet gripping edges 40. The sheet gripping edges are laterally spaced to define therebetween a side opening 42 in the base member 22 which opens into the interior channel like cavity 44 in the base member.

The innerlock member 28 has a laterally flexible channel portion 46 and a lip 48. Channel portion 46 is formed by a relatively thin flexible arcuate wall with longitudinal edges 52 which define longitudinal sheet gripping edges on the channel portion 46. The channel portion 46 has an open longitudinal side between its sheet gripping edges 52.

The innerlock lip 48 is curved in transverse cross-section and is substantially longitudinally coextensive with innerlock channel portion 46. Lip 48 is rigidly joined along one longitudinal edge to the inner side of the channel portion wall 50 adjacent and generally parallel to one edge 52 of the wall. The lip extends outwardly through and beyond the open side of the channel portion 46. Integrally joined to the channel portion wall 50 along its opposite longitudinal edge 52 is a resilient, inwardly directed flange 54 which is substantially longitudinally coextensive with the channel portion.

The innerlock member 28 is adapted to be placed in its assembled position of FIGS. 2 and 4 within the base member 26, wherein the open side of the innerlock channel portion 46 faces the base member side opening 42. The lateral spacing between the sheet gripping edges 52 on the innerlock channel portion 46 is greater than the width of the base member side opening 52 measured between base member gripping edges 40. Accordingly, when the innerlock member 28 occupies its assembled position within the base member 26, the sheet gripping edges 52 of the innerlock channel portion are disposed to abut the base member edge walls 34 along abutment lines 56 adjacent and parallel to the base member gripping edges 40. The height of the innerlock channel portion 46, measured between a plane containing its gripping edges 52 and a plane parallel to this edge plane and tangent to the curved inner side of the channel portion wall 50 is slightly greater than the spacing between a plane containing the abutment lines 56 and the inner surface of the base wall 32 of base member 26. The inner side of this base wall contains a central longitudinally extending recess 58 which provides clearance for the channel portion 46 of the innerlock member 28 and into which the laterally central portion of the channel portion wall 50 protrudes, in the manner illustrated in FIGS. 2 and 4, when the innerlock member occupies its assembled position within the base member.

It will now be understood that when the innerlock member 28 is assembled within the base member 26, the innerlock channel portion 46 spans, and its open side faces, the base member side opening 42. The sheet gripping edges 52 of the channel portion 46 abut the base member edge walls 34 adjacent or substantially along their gripping edges 40 and the channel portion wall 50 arches toward and in close proximity to the base wall 32 of the base member. In this assembled position of the innerlock member 28, its curved lip 48 extends outwardly through the base member side opening 42 adjacent one sheet gripping edge 40 of the base member. For reasons which will be explained presently, this adjacent sheet gripping edge of the base member is the uppermost gripping edge in the case of any horizontally extending sheet gripping assembly.

When securing the plastic sheet or film 20 to a present sheet gripping assembly 22, the plastic film is first placed across the open side of the base member 26 after which the innerlock member 28 is inserted into the base member through its side opening 42 to tuck or fold the plastic film into the base cavity 44. When thus inserting the innerlock member into a horizontally disposed base member, such as a base member fixed to one of the overhead horizontal beams 16 in FIG. 1, the innerlock member 28 is positioned with its lip 48 uppermost and the opposite, lower edge 52 of its channel portion (hereafter referred to as the free edge of the channel portion) is inserted through the base opening first with a combined inward and downward movement, as viewed in FIGS. 2 through 4. The innerlock member is thus inserted to the initial position of FIG. 3 wherein its lower free edge presses against the inner side of the lower edge wall 34 of the base member. Finger pressure is then applied to the innerlock lip 48 to bend the innerlock channel portion 46 laterally to its laterally contracted configuration of FIG. 4, wherein it can pass freely through the base member side opening 42 into the interior of the base member. The remaining portion of the innerlock member 28 is then inserted into the base member by pressing inwardly on the innerlock lip 48 and released to assure its final assembled position of FIG. 2. During this final insertion or assembly of the innerlock member within the base member, the innerlock member rotates about its lower free edge 52 as a pivot.

In the final assembled position of the innerlock member 28 within the base member 26, the plastic film 20 forms, in effect, a fold within the base member and the innerlock member 28 is disposed within this fold. The plastic film 20 enters the base member 26 between its upper gripping edge 40 in FIG. 2 and the lip 48 of the innerlock member 28. The plastic film then extends around the innermost side of the innerlock channel portion 46 and between the innerlock gripping edges 52 and the base member edge walls 34, and then emerges from the base member through its side opening, adjacent the lower gripping edge 40 of the base member in FIG. 2.

Final securing of the plastic film 20 to the sheet gripping assembly 22 is accomplished by laterally inserting the gripping bar member 30 through the base member side opening 42 to its final assembled position of FIG. 2. In this final assembled position, the locking bar member is disposed within the open side of the innerlock channel portion 46 and projects outwardly against the innerlock lip 48 and the lower base gripping edge 40. The lateral dimension of the gripping bar member 30 is greater than the width of the base member side opening 42 measured between the base gripping edges 40 so that tension in the plastic film 20 urges the innerlock member 28 and gripping bar member 30 outwardly to grip the film between the gripping bar member and the base gripping edges.

In this latter regard, it will be seen that the outward force on the gripping bar member 30 produced by tension in the plastic film 20 urges the gripping bar member outwardly against the innerlock lip 48, flange 54 and the lower base gripping edge 40 in FIG. 2. The outward pressure of the gripping bar member 30 against the innerlock lip 48 deflects the latter upwardly against the upper base gripping edge 40 to grip the plastic film 20 between the latter edge and the lip. The outward pressure of the gripping bar member 30 against the lower base gripping edge 40 and the inwardly extending flange 54 grips the plastic film between this edge and the gripping bar member. In addition, the outward force produced on the innerlock member 28 by the tension in the plastic film urges the innerlock gripping edges 52 firmly against the base member edge walls 34 to additionally grip the plastic film between the latter gripping edges and edge walls.

This lateral abutment of the innerlock gripping edges 52 against the base member edge walls 34 also prevents total dislodging of the gripping bar member 30 from the base member 26. In this regard, it is evident that lateral insertion of the gripping bar member 30 through the base member side opening 42 to its assembled position within the base member 26 requires that either the base member or the gripping bar member be sufficiently resilient to permit passage of the bar through the side opening. In the particular inventive embodiment illustrated, the base member 26 is rigid and may comprise a metal extrusion. The gripping bar member 30 is a hollow plastic tube or the like which is sufficiently laterally resilient to permit squeezing of the tube through the base opening 42.

Because of the resiliency of the sheet gripping bar or tube 30, it is possible that excessive tension in the plastic film 20 and/or increasing air pressure within a double walled plastic film as a result of increasing air temperature, might dislodge the gripping bar member from the base member by forcing the bar member outwardly through the base member side opening 42. In the sheet gripping assembly of this invention, as in that of my prior U.S. Pat. No. 4,103,401, such dislodging of the gripping bar member from the base member is prevented by abutment of the innerlock gripping edges with the base member edge walls 34, as discussed above. Moreover, the gripping bar member 30, which is disposed between the innerlock gripping edges 52, prevents inward deflection of these edges toward one another sufficiently to enable the innerlock member to pass through the base member side opening 42, whereby dislodging of the gripping bar member from the base member is prevented.

The innerlock lip 48 constitutes an important feature of the invention which achieves several important benefits. As already noted, for example, when inserting the innerlock member 28 into the base member 26, the innerlock member is laterally contracted to its broken line contracted configuration of FIG. 4, to pass through the base member side opening 42, by exerting finger pressure on the lip. The lip thus facilitates assembly of the innerlock member within the base member. The innerlock lip 48 also facilitates removal of the innerlock member from the base member. In this regard, it will be observed in FIG. 5 that when the innerlock member 28 is assembled in the base member 26, the innerlock lip 48 is accessible externally of the base member for lateral contraction of the innerlock member sufficiently to pass outwardly through the base member side opening 42 by exerting finger pressure on the lip. It will also be seen in FIG. 5 that this finger pressure on the innerlock lip 48, in addition to contracting the innerlock member for passage through the base member side opening 42, also extracts the upper portion of the innerlock member from the base member through the side opening. The innerlock member is then easily finally removable from the base member by upward and outward movement of the innerlock member. It will be evident, of course, that the gripping bar member 30 is removed prior to this removal of the innerlock member 28 so as to permit lateral contraction of the latter member by finger pressure on its lip 48.

Another benefit of the innerlock lip 48 resides in the fact that it shields the plastic film 20 against direct contact with the gripping bar member 30 during insertion of the latter into and removal of the latter from the base member 26. This prevents the possibility of tearing or rupturing of the plastic film by the gripping bar member during its insertion into or removal from the base member. The gripping bar member 30, of course, directly engages the plastic film 20 along the opposite side of the base opening 42 and forces the plastic film against the adjacent base member gripping edge 40. Accordingly, there is some possibility that tearing or rupture of the plastic film might occur at this point. According to the present invention, however, a gripping assembly 22 according to the invention which is mounted in a horizontal position, such as the sheet gripping assemblies mounted on the horizontal greenhouse frame beams 22 in FIG. 1, are mounted with innerlock lip 48 uppermost, as noted earlier. Accordingly, any rupture or tearing of the plastic film which occurs will occur along the lower gripping edge 40 of the assembly base member 26. The weather tight integrity of the gripping assembly will thus be maintained by the gripping relation of the upper base member gripping edge 40 and innerlock lip 48 with the plastic film 20 along the upper side of the sheet gripping assembly.

The inventor claims:

1. An innerlock member for a sheet gripping assembly for thin pliable sheet material, the assembly including a relatively rigid base channel having laterally inwardly curved side walls and defining a longitudinal cavity with an open longitudinal side, and an elongate cylindrical gripping bar, said innerlock member comprising:

an elongate innerlock channel having a relatively thin flexible arcuate wall with laterally spaced longitudinal edges and a longitudinal side opening between and in a plane containing said wall edges a lip joined to the inner side of said innerlock channel arcuate wall adjacent but spaced from one of said wall edges and extending through and well beyond said plane of said side opening of said innerlock channel, and an inwardly directed resilient flange joined at one end to the inner side of said innerlock channel arcuate wall at the wall edge opposite said lip and extending at an acute angle to said arcuate wall, said lip being sufficiently stiff that said innerlock channel arcuate wall is bendable by opposing forces applied to said lip and to said arcuate wall adjacent the other longitudinal edge thereof to laterally constrict said innerlock channel for insertion and removal thereof through the open side of a base channel and into and from a position with a base channel where said innerlock channel is disposed to receive a gripping bar.

* * * * *